(12) United States Patent
Lenaburg et al.

(10) Patent No.: US 11,905,023 B2
(45) Date of Patent: *Feb. 20, 2024

(54) EVACUATION SLIDE WITH MARKINGS AND LIGHTING FOR EGRESS FROM AN AIRCRAFT

(71) Applicant: The Boeing Company, Arlington, VA (US)

(72) Inventors: Robert J. Lenaburg, Des Moines, WA (US); Paul J. Wilcynski, Seattle, WA (US); Rodney M. Burgin, Everett, WA (US); Steven P. McDonald, Marysville, WA (US); Bruce E. Wallace, Mill Creek, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,215

(22) Filed: Mar. 8, 2023

(65) Prior Publication Data

US 2023/0242263 A1 Aug. 3, 2023

Related U.S. Application Data

(63) Continuation of application No. 16/859,158, filed on Apr. 27, 2020, now Pat. No. 11,618,578.

(51) Int. Cl.
   *B64D 25/14* (2006.01)
   *B64D 47/02* (2006.01)
   *A62B 1/20* (2006.01)

(52) U.S. Cl.
   CPC ............. *B64D 25/14* (2013.01); *B64D 47/02* (2013.01); *A62B 1/20* (2013.01)

(58) Field of Classification Search
   CPC .......... B64D 25/14; B64D 47/02; A62B 1/20; G08B 7/066; Y10S 244/905
   See application file for complete search history.

(56) References Cited

U.S. PATENT DOCUMENTS

| 3,463,915 A | 8/1969 | Day |
| 3,621,383 A | 11/1971 | Rush et al. |

(Continued)

FOREIGN PATENT DOCUMENTS

| EP | 2655190 A1 | 6/2012 |
| EP | 3031727 A1 | 6/2016 |

(Continued)

OTHER PUBLICATIONS

EAM Worldwide, "Slides: Reliable Equipment for Safe Deplaning", pp. 1-6, retrieved on Sep. 9, 2020, retrieved from internet: https://eamworldwide.com/slides/.

(Continued)

*Primary Examiner* — Alexander K Garlen
(74) *Attorney, Agent, or Firm* — COATS & BENNETT, PLLC

(57) ABSTRACT

An evacuation slide to provide an egress path from an exit of an aircraft. The evacuation slide includes one or more slide lanes. One or more jump targets and indicators are positioned along each of the slide lanes to visually inform persons how to enter a ramp of the slide. Lights illuminate one or more sections of the slide to further provide visual guidance on how to enter the ramp.

20 Claims, 8 Drawing Sheets

(56) References Cited

U.S. PATENT DOCUMENTS

| | | | |
|---|---|---|---|
| 3,712,417 | A | 1/1973 | Chacko et al. |
| 5,975,467 | A | 11/1999 | O'Donnell et al. |
| 9,626,846 | B2 | 4/2017 | Kohlmeier-Beckmann et al. |
| 10,246,195 | B2 | 4/2019 | Prevost et al. |
| 10,429,188 | B2 | 10/2019 | Robinson et al. |
| 10,654,575 | B1 | 5/2020 | Biro |
| D980,370 | S | 3/2023 | Peterson |
| 11,618,578 | B2 | 4/2023 | Lenaburg et al. |
| 2003/0234323 | A1 | 12/2003 | Danielson et al. |
| 2005/0115794 | A1 | 6/2005 | Zonneveld |
| 2014/0009274 | A1 | 1/2014 | Kohlmeier-Beckmann et al. |
| 2015/0097083 | A1 | 4/2015 | Fellmann et al. |
| 2015/0151843 | A1* | 6/2015 | Kohlmeier-Beckmann .......... B64D 25/14 182/48 |
| 2016/0167794 | A1 | 6/2016 | Kohlmeier-Beckmann et al. |
| 2016/0167795 | A1 | 6/2016 | Kohlmeier-Beckmann et al. |
| 2016/0171848 | A1 | 6/2016 | Kohlmeier-Beckmann et al. |
| 2018/0072427 | A1 | 3/2018 | Prevost et al. |
| 2019/0077515 | A1* | 3/2019 | Volny .......... B64D 25/14 |
| 2019/0112059 | A1 | 4/2019 | Haynes et al. |
| 2021/0147090 | A1* | 5/2021 | Jurlina .......... G08B 5/38 |
| 2021/0147314 | A1 | 5/2021 | Shen et al. |
| 2021/0221523 | A1 | 7/2021 | Haynes et al. |
| 2021/0331811 | A1 | 10/2021 | Lenaburg et al. |

FOREIGN PATENT DOCUMENTS

| | | |
|---|---|---|
| EP | 3031729 A1 | 6/2016 |
| EP | 3031728 B1 | 7/2017 |

OTHER PUBLICATIONS

Hester, E., "How does an airplane's emergency slide 'accidentally' deploy?", Nov. 26, 2017, Los Angeles Times, pp. 1-7, retrieved on Sep. 9, 2020, retrieved from internet: https://www.latimes.com/travel/la-tr-fly-guy-20171126-story.html.

Collins Aerospace, A Raytheon Technologies Company, "Evacuation Systems", pp. 1-4, retrieved on Sep. 9, 2020, retrieved from internet: https://www.collinsaerospace.com/what-we-do/Commercial-Aviation/Cabin/Evacuation-Systems.

Brown, D., "Photo Tour of Singapore Airlines Training Facility", Airline Reporter, pp. 1-7, retrieved on Sep. 9, 2020, retrieved from internet: https://www.airlinereporter.com/2011/07/photo-tour-of-singapore-airlines-training-facility/.

* cited by examiner

EVACUATION SLIDE WITH MARKINGS AND LIGHTING FOR EGRESS FROM AN AIRCRAFT

RELATED APPLICATIONS

This application is a continuation application of U.S. application Ser. No. 16/859,158 filed Apr. 27, 2020 which is herein incorporated by reference in its entirety.

TECHNICAL FIELD

The present disclosure relates generally to the field of evacuation slides for aircraft and, more specifically, to evacuation slides with visual aspects to increase the efficiency of persons using the slide to exit from the aircraft.

BACKGROUND

Evacuation slides provide for rapid egress from an aircraft during an event. The evacuation slides are positioned at the doors or wings of the aircraft. The evacuation slides angle downward and provide for persons to enter the slide by stepping or jumping outward onto a ramp and sliding along the length to the ground.

Evacuation slides are somewhat intuitive to use but their efficiency in getting persons to the ground is highly dependent upon how the person enters the slide and how quickly they make the decision to do so. Persons can be hesitant in evaluating the unknowns about using the evacuation slide and their choice of how to enter the slide (e.g., whether to walk, sit and scoot, or jump). This hesitation dramatically affects the time it takes the person to reach the ground and the efficiency of the slide to quickly get a large number of persons off the aircraft.

A person's hesitation and choice of how to enter the slide can also have an effect on the potential for them to sustain injury in the process. Hesitation can cause a person to be pushed by another person which can lead to injury. For example, a hesitant person can be pushed, either intentional or unintentionally, out of the aircraft by a person behind them who is in a hurry to exit. This can also cause injury by the person entering the slide in a non-optimal position (e.g., head first). When there is more than one slide lane, the hesitation and effects of missing the ideal entry point are much more pronounced. A person can clog entry into multiple slide lanes thus slowing the efficiency and causing persons remaining on the aircraft to wait longer to egress.

BRIEF SUMMARY

One aspect is directed to a slide to provide an egress path from an exit of an aircraft. The slide comprises a porch configured to attach to the aircraft. A ramp comprising first and second slide lanes extends between an upper end at the porch and an opposing lower end. First and second jump targets are positioned on the first and second slide lanes respectively, and each of the first and second jump targets is spaced away from the porch. A first pair of lane markers is positioned on the ramp and extends along lateral sides of the first slide lane. A second pair of lane markers is positioned on the inflatable ramp and extends along lateral sides of the second slide lane. Each of the first and second pairs of lane markers outlines lateral sides of the first and second slide lanes, respectively, and provides a visual identification of the first and second slide lanes. The first jump target is positioned between the first pair of the lane markers and the second jump target is positioned between the second pair of lane markers. The first and second jump targets are constructed from a first material with a higher visibility than the first and second slide lanes and the first and second pair of lane markers.

In another aspect, the first and second pair of lane markers share a common central dividing marker that extends along a center line of the inflatable ramp.

In another aspect, the first pair of lane markers are elevated above the first jump target, and the second pair of lane markers are elevated above the second jump target.

In another aspect, the first and second pairs of lane markers comprise a central dividing marker and outer lateral lane markers that extend along outer lateral edges of the respective first and second slide lanes with the central dividing marker positioned a different distance from the porch than the outer lateral lane markers.

In another aspect, a slide end indicator is positioned on the inflatable ramp at the lower end with the first and second jump targets and the slide end indicator constructed from the same materials to have the same visual appearance.

In another aspect, a fuselage light is configured to attach to the fuselage of the aircraft with the fuselage light positioned to illuminate an upper section of the slide comprising the porch and the ramp from the upper end to the first and second jump targets.

In another aspect, ramp lights are spaced apart along the ramp to illuminate the first and second slide lanes with a first one of the ramp lights aligned with the first jump target and a second one of the ramp lights aligned with the second jump target.

In another aspect, the first and second pairs of lane markers are visibly darker than the ramp.

One aspect is directed to a slide to provide an egress path from an exit of an aircraft. The slide comprises a porch configured to attach to the aircraft. A ramp comprises: an upper end attached to the porch and an opposing lower end configured to contact a ground with the ramp comprising first and second side walls and a central divider positioned between the first and second side walls; a first slide lane positioned between the first side wall and the central divider with the first slide lane extending from the upper end to the lower end; and a second slide lane positioned between the second side wall and the central divider with the second slide lane extending from the upper end to the lower end. A first jump target is positioned on the first slide lane and spaced away from the first side wall and the central divider. A second jump target is positioned on the second slide lane and spaced away from the second side wall and the central divider. Each of the first and second jump targets is spaced away from the porch by a jump distance. The first and second jump targets have a greater visibility than the ramp.

In another aspect, a fuselage light is configured to be attached to the fuselage of the aircraft with the fuselage light positioned to illuminate the first and second jump targets.

In another aspect, ramp lights are spaced apart along a length of each of the first and second side walls and positioned to illuminate the first and second slide lanes with a first one of the ramp lights aligned with the first jump target and a second one of the ramp lights aligned with the second jump target.

In another aspect, a slide end indicator is positioned at a lower end of the inflatable ramp with the slide end indicator being continuous across both the first and second slide lanes and with at least two of the ramp lights being aligned with the slide end indicator.

In another aspect, the first and second jump targets and the slide end indicator are a coating attached to the ramp.

In another aspect, the coating has a higher visibility than the first and second slide lanes.

In another aspect, the first and second jump targets are each spaced an equal height vertically below the porch and an equal distance along the ramp from the porch.

One aspect is directed to a method of positioning a slide on an aircraft to provide an egress path from an exit of the aircraft. The method comprises: deploying the slide with a porch attached to the aircraft at the exit and a ramp extending from the porch with a distal end of the ramp contacting a ground; aligning a first jump target positioned on a first slide lane horizontally outward from and vertically below the porch; aligning a second jump target positioned on a second slide lane horizontally and vertically away from the porch and laterally away from the first jump target; visually obscuring an elevated divider that extends along the ramp and between the first and second jump targets; and illuminating the first and second jump targets a greater amount than a remainder of the ramp.

In another aspect, the method comprises aligning one or more jump lines at an intersection of the porch and the ramp outward away from the exit of the aircraft.

In another aspect, the method comprises visually highlighting a slide end indicator at the distal end of the ramp a greater amount than a section of the ramp between the first and second jump targets and the slide indicator.

In another aspect, the method comprises aligning ramp lights and illuminating the first and second jump targets.

In another aspect, the method comprises aligning arrows that are positioned on the porch to be directed to the first and second slide lanes.

The features, functions and advantages that have been discussed can be achieved independently in various aspects or may be combined in yet other aspects, further details of which can be seen with reference to the following description and the drawings.

DETAILED DESCRIPTION

Figure 1:
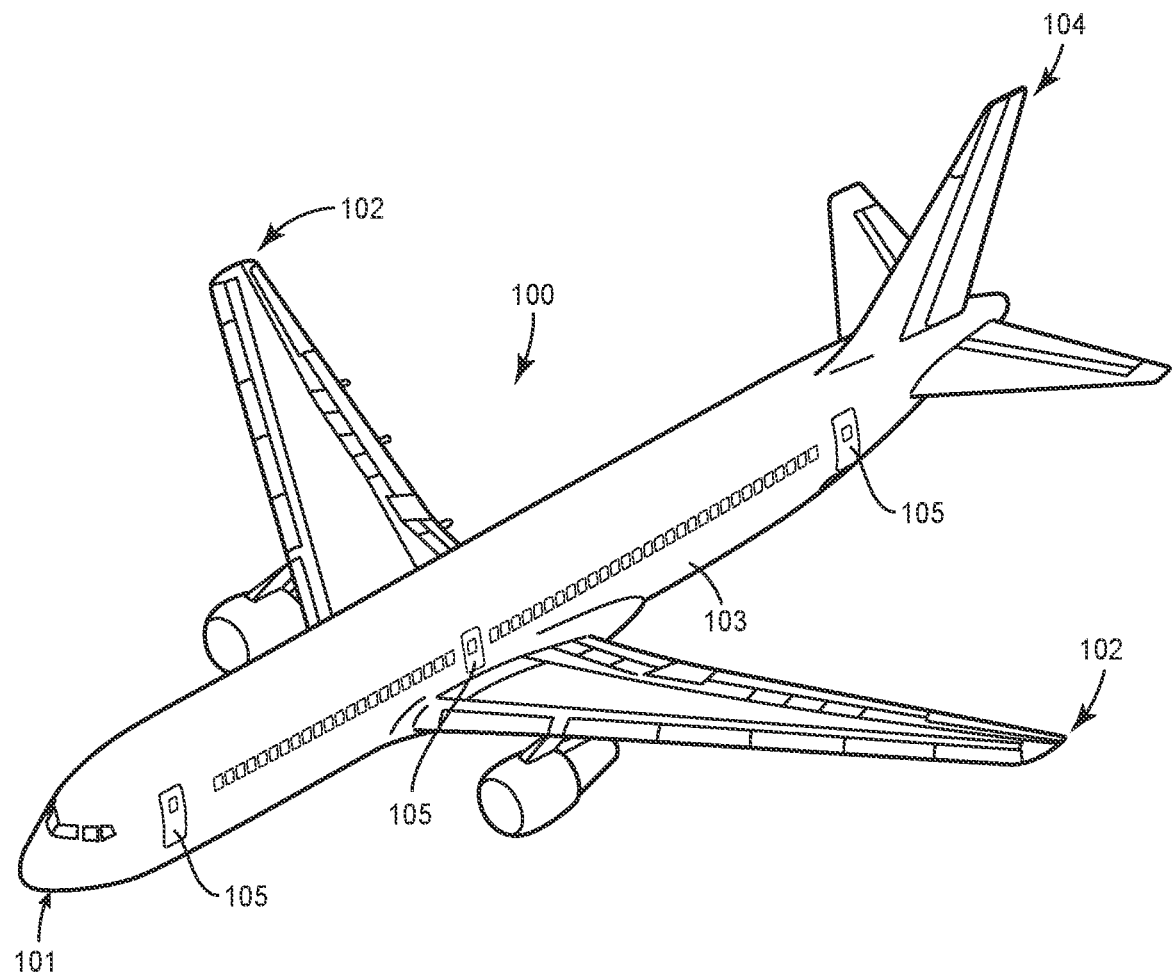
FIG. 1 is a perspective view of an aircraft.

FIG. 1 illustrates an example of an aircraft 100. The aircraft 100 includes a nose 101, wings 102, a fuselage 103, and a tail 104. An interior of the fuselage 103 includes a cabin area configured to accommodate a variety of persons, including passengers and flight crew. A cockpit area at the nose 101 houses one or more flight control personnel (e.g., pilot, co-pilot) that control the aircraft. One or more exits 105 along the fuselage 103 provide for egress from the interior of the aircraft 100 during an event. The number of exits 105 can vary depending upon the size of the aircraft 100 and/or the number of persons within the aircraft 100.

Figure 2:
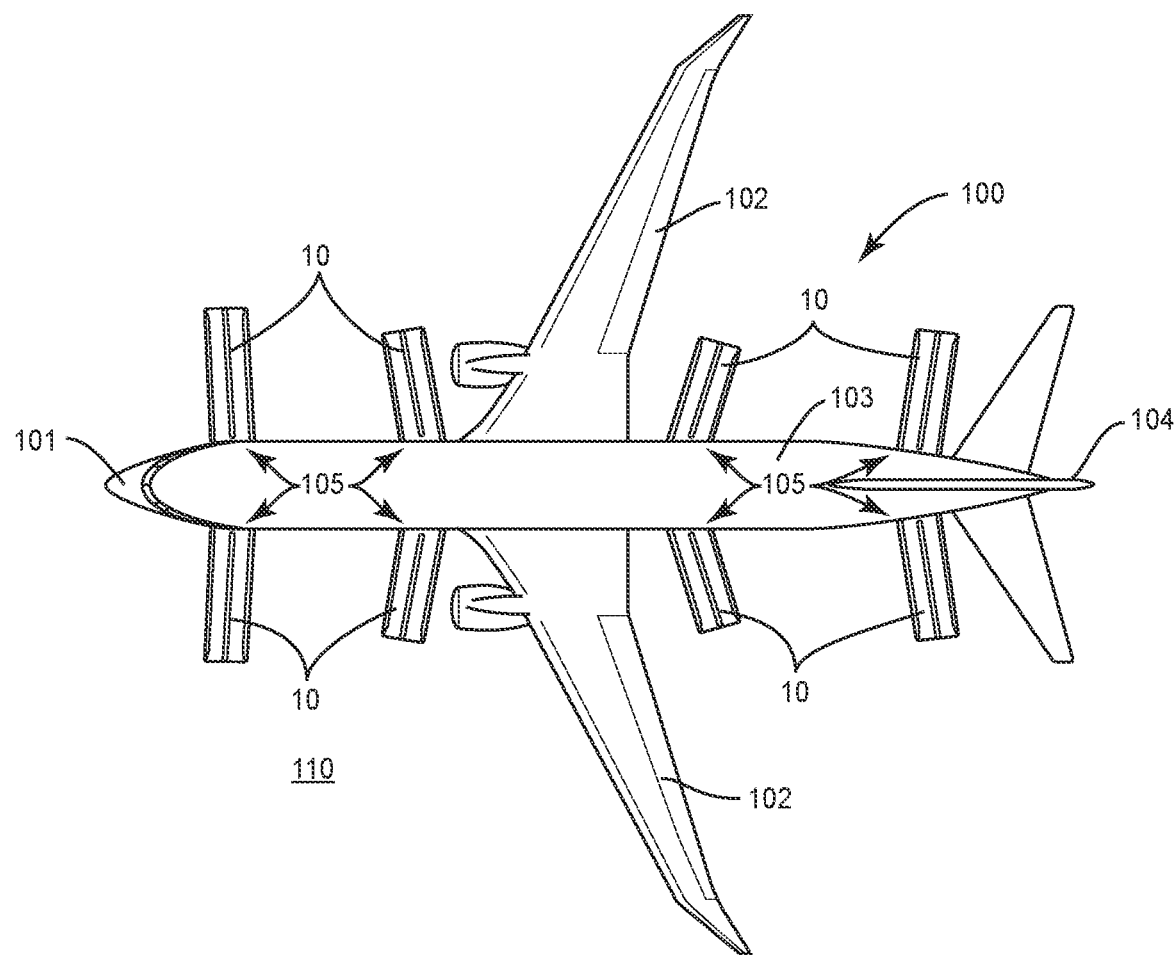
FIG. 2 is a top view of an aircraft with slides extending outward from a fuselage of the aircraft.

During an event and after the aircraft 100 has landed on the ground 110, one or more slides 10 deploy at exits 105 in the fuselage 103. Because of the size of aircraft 100 and the height of the fuselage 103 above the ground 110, the one or more slides 10 provide for safely moving the persons from the fuselage 103 to the ground 110. FIG. 2 illustrates an aircraft 100 with eight slides 10 that provide for assisting persons to reach the ground 110. In one example, each of the slides 10 includes the same shape and size. In another example, two or more of the slides 10 have different sizes and/or shapes. For example as illustrated in FIG. 2, the slides 10 at the wings 102 are aligned at different angles relative to the fuselage 103 than the slides 10 towards the nose 101 and tail 104.

The slides 10 are configured to visually instruct a person standing at an exit 105 on how to enter the slide 10 and reach the ground 110. The slides 10 include visual prompts that quickly indicate to a person how to enter the slide 10. This quick entry increases the efficiency of the slide 10 which is the number of persons that can evacuate the aircraft 100 by the slide 10 in a given time period.

Figure 3:
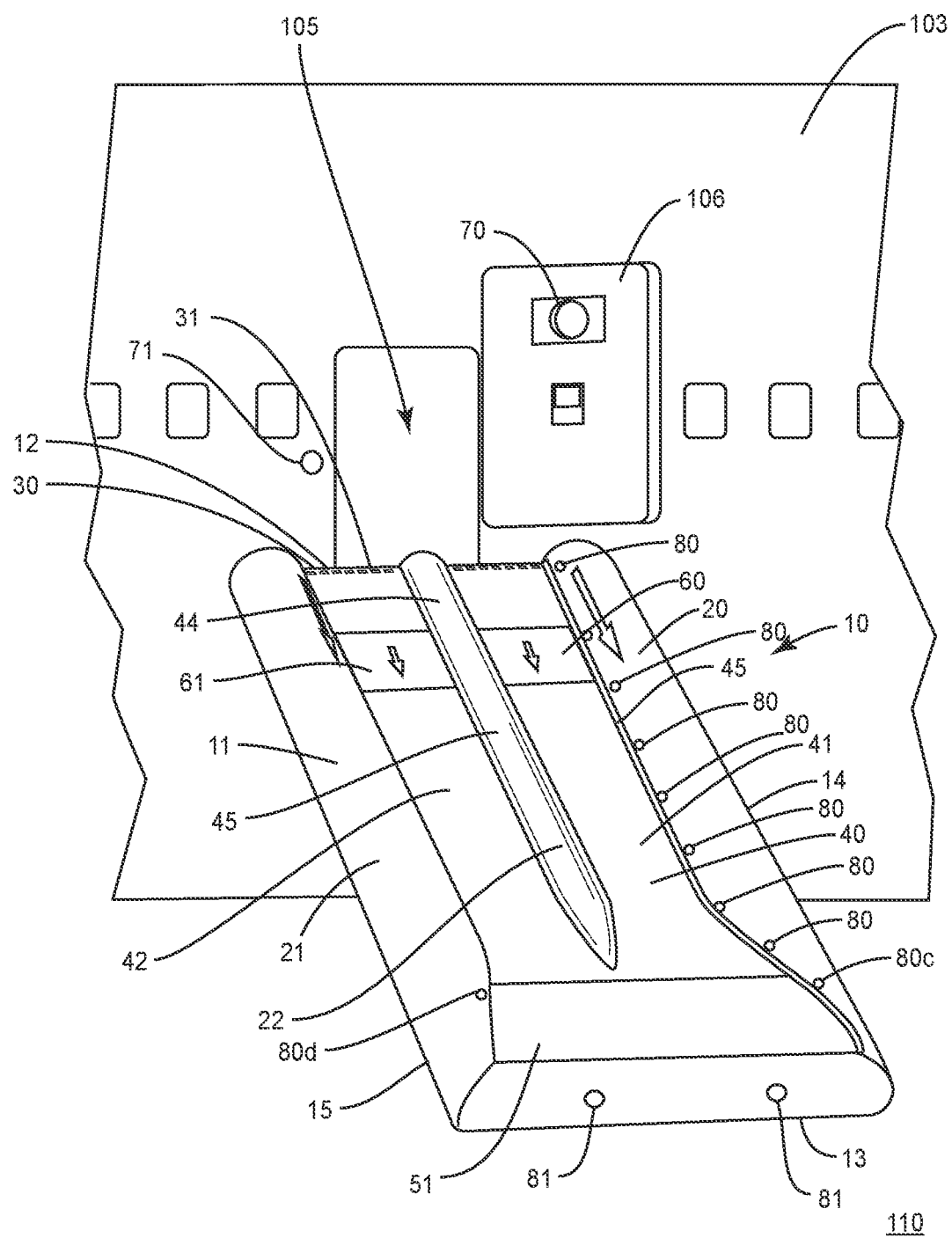
FIG. 3 is a perspective view of a slide extending outward at an exit of a fuselage of an aircraft.
Figure 4:
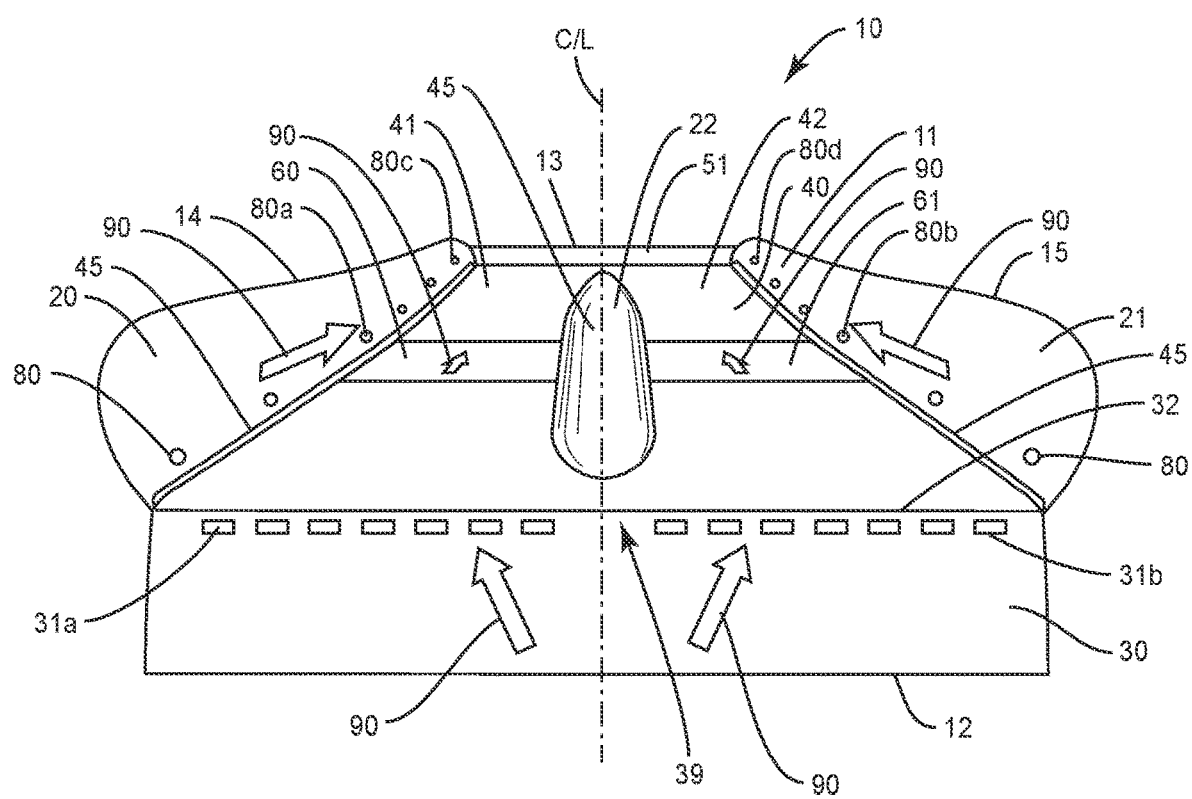
FIG. 4 is a perspective view from a top of a slide.

As illustrated in FIGS. 3 and 4, the slide 10 includes a body 11 with a first end 12 that is attached to the aircraft 100 and an opposing second end 13 that contacts against the ground 110. A length of the slide 10 is measured between the first and second ends 12, 13. The slide 10 includes lateral sides 14, 15 that extend between the first and second ends 12, 13. A width of the slide 10 is measured between the lateral sides 14, 15. The slide 10 is positioned between a stowed orientation when the aircraft 100 is operating under normal operating conditions, and a deployed position as illustrated in FIGS. 2, 3 and 4.

Figure 6:
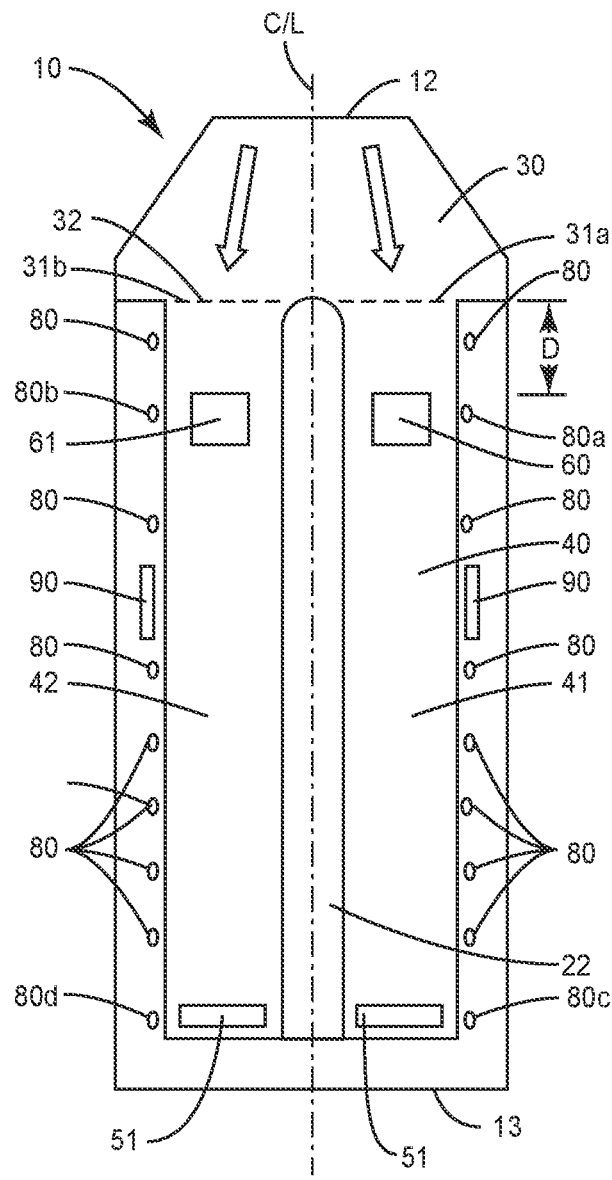
FIG. 6 is a front view of a slide in a flat, extended orientation to illustrate the porch and the ramp.

The slide 10 includes a porch 30 at the first end 12 of the body 11 and a ramp 40 that extends from the porch 30 to the second end 13. The porch 30 forms a platform for the person who is standing at the exit 105. The porch 30 can include different shapes and sizes. In one example, as illustrated in FIG. 4, the porch 30 is substantially rectangular with a width about equal to the ramp 40. In another example as illustrated in FIG. 6, the porch 30 includes a polygonal shape. The first end 12 is relatively narrow to match the relatively narrow exit 105 at the fuselage 103. The porch 30 then widens to the width of the ramp 40. In one example, the shape and/or size of the porch 30 accommodates the angle at which the slide 10 extends outward from the fuselage 103 when deployed. Using FIG. 2 as an example, the porches 30 of the slides 10 in proximity to the wings 102 are canted outward away from the wings 102 and thus can include a different shape than the slides 10 positioned towards the nose 101 and tail 104.

Figure 5:
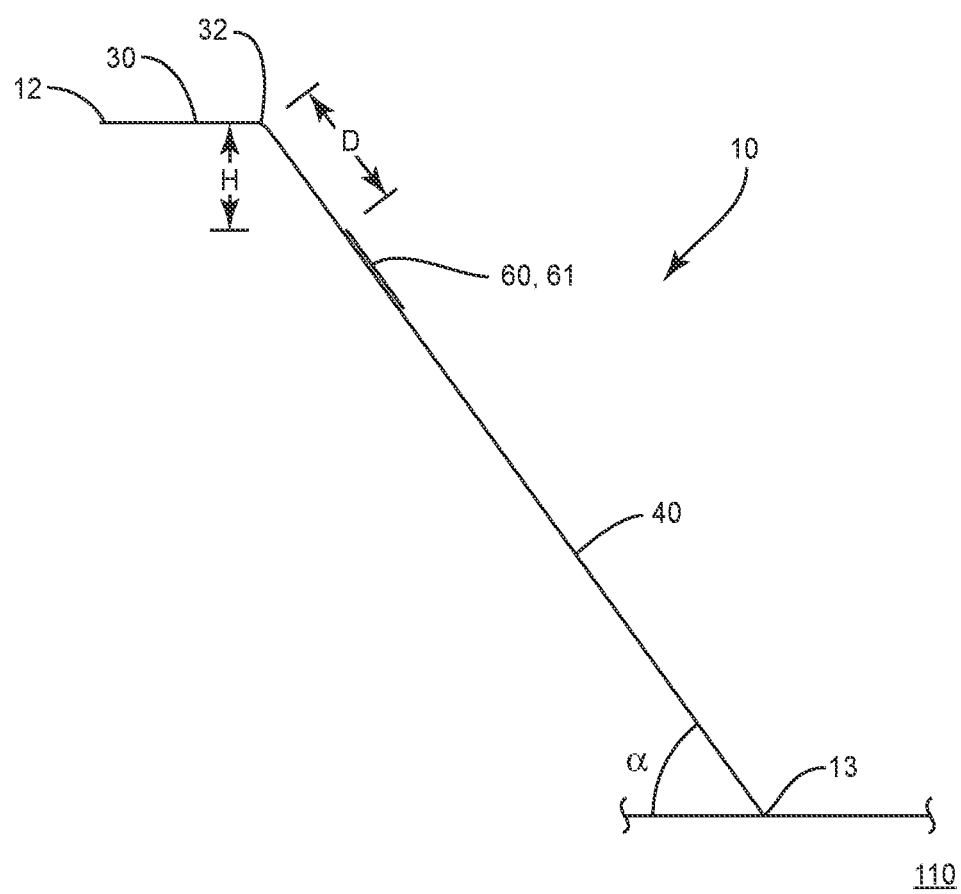
FIG. 5 is a schematic side view of a slide that includes a porch and a ramp.

As illustrated in FIG. 5, the ramp 40 is positioned at an angle α relative to the ground 110 to carry the person to the ground 110. An edge 32 is formed at the intersection of the porch 30 and the ramp 40. The ramp 40 is inflated in the deployed position. The inflation provides for the ramp 40 to support the weight of persons moving along its length.

The ramp 40 includes side walls 20, 21 that extend, respectively, along the first and second lateral sides 14, 15. In one example, the side walls 20, 21 extend along the porch 30. In another example, as illustrated in FIG. 4, the side walls 20, 21 begin at the upper end of the ramp 40 defined by the edge 32. In one example, the side walls 20, 21 extend the entire length of the ramp 40 to the second end 13. In another example, the side walls 20, 21 terminate inward from the second end 13.

The ramp 40 also includes a center divider 22 that extends between the side walls 20, 21. In one example, an upper end of the center divider 22 is positioned at the edge 32. In another example, as illustrated in FIG. 4, the center divider 22 is spaced downward from the edge 32. As further illustrated in FIG. 4, the center divider 22 does not extend into the porch 30.

A first slide lane 41 is formed between the side wall 20 and the center divider 22. A second slide lane 42 is formed between the side wall 21 and the center divider 22. The slide lanes 41, 42 form the routes of egress for the persons to move along the ramp 40 and reach the second end 13 and the ground 110. The slide lanes 41, 42 are smooth to facilitate sliding by the persons. The side walls 20, 21 and the center divider 22 extend upward above the slide lanes 41, 42 to prevent the persons from laterally exiting the slide lanes 41, 42 prior to reaching the second end 13.

A bottom section of the slide lanes 41, 42 immediately upstream from the second end 13 may be configured to slow persons that are moving down the ramp 40. This slowing provides for the persons to be at a speed to transition to the ground 110 and move away from the aircraft 100.

Visual cues are attached to the body 11 at different locations to visually inform a person how to enter the slide 10 and how to exit the slide 10. A first type of visual cue includes first and second jump targets 60, 61 positioned respectively along the first and second slide lanes 41, 42. The first and second jump targets 60, 61 visually identify the separate first and second slide lanes 41, 42 and provide a target for the persons to step or otherwise jump from the porch 30 onto the ramp 40.

The first jump target 60 is positioned on the first slide lane 41. The first jump target 60 does not extend onto either the side wall 20 or the center divider 22. This positioning provides a visual cue for the person to contact the first slide lane 41 and not the side wall 20 or center divider 22. Entering the ramp 40 at the side wall 20 or center divider 22 could injure the person or reduce the efficiency of the slide 10 by causing the person to move slower along the ramp 40 and/or occupy both the first and second slide lanes 41, 42.

In a similar manner, the second jump target 61 provides a visual cue for a person to enter the second slide lane 42. The second jump target 61 is positioned on the second slide lane 42 and does not extend onto either the side wall 21 or the center divider 22.

In one example, the first and second jump targets 60, 61 are both positioned at the same location along the length of the ramp 40. The first and second jump targets 60, 61 can be identical in shape and size and with identical indicia. This visually indicates to a person that the two slide lanes 41, 42 are the same and either can be used to reach the ground 110. In another example, the first and second jump targets 60, 61 are positioned at different locations along the length of the ramp 40. In the various examples, the jump targets 60, 61 are positioned along the ramp 40 a distance away from the edge 32. This distancing visually indicates to persons that they are to step or jump from the porch 30 and onto the ramp 40. This prevents persons from sitting on the porch 30 and scooting to the ramp 40 which slows their progress and reduces the efficiency of the slide 10.

FIG. 5 schematically illustrates a slide 10 with the first and second jump targets 60, 61 positioned a distance D from the edge 32. The distance D is beyond the upper ends of the side walls 20, 21 and the center divider 22. This prevents the person from grabbing the ends of these objects and slowing or stopping their movement down the ramp 40. This distance also positions the first and second jump targets 60, 61 a height H below the porch 30. This horizontal and vertical positioning causes a person's momentum to be moving forward to thus propel them down the slide lanes 41, 42 and more quickly reach the second end 113 and exit the slide 10. The distance D and height H can be the same or different.

Another visual cue is a jump line indicator 31 positioned at the edge 32 to visually indicate the transition between the porch 30 and the ramp 40. The jump line indicator 31 provides a visual cue to the person how far they can step onto the porch 30 before entering the ramp 40. This prevents a person from accidentally entering onto the ramp 40 which could injure the person and/or slow the efficiency of the slide 10. The jump line indicator 31 includes a series of dashes aligned across a majority of the width of the body 11.

In one example, the jump line indicator 31 is a single line that extends across the body 11. In another example, the jump line indicator 31 includes separate sections that are aligned at the top of each of the slide lanes 41, 42. As illustrated in FIG. 4, this includes a first jump line indicator 31a positioned at the top of the first slide lane 41 and a second jump line indicator 31b positioned at a top of the second slide lane 42. The two jump line indicators 31a, 31b are separated by a space 39 that is aligned with the top of the center divider 22. The space 39 provides a visual indication of the center divider 22 and informs a person to go to the right or left to enter just one of the first and second slide lanes 41, 42 of the ramp 40.

The jump line indicator 31 (either as a single line or multiple sections) can be positioned at various positions on the body 11. In one example, as illustrated in FIG. 4, the jump line indicator 31 is parallel to the edge 32. In another example, the jump line indicator 31 is at an angle to the edge 32 to indicate a unique point of entry into each of the first and second slide lanes 41, 42. In one example, the jump line indicator 31 is aligned in a straight line that is perpendicular to the centerline C/L. In one example, this positioning is used on a slide 10 that extends straight outward from the fuselage 103 (e.g., slides 10 towards the nose 101 and tail 104 as illustrated in FIG. 2) In another example, the jump line indicator 31 is aligned in a straight line that is not perpendicular to the centerline C/L. In one example, the non-perpendicular positioning is on slides 10 that are canted away from the wings 102. In another example, the jump line indicator 31 is arranged in a curved or otherwise non-straight arrangement.

Another visual cue is one or more indicators 90 positioned on the porch 30 to visually indicate that there are two slide lanes 41, 42. As illustrated in FIG. 4, the indicators 90 can be in the form of arrows that point towards the respective slide lanes 41, 42. In one example with multiple indicators 90, the indicators 90 are visually identical to indicate to a person that both slide lanes 41, 42 are equal and can be used to exit the aircraft 100. In another example, the indicators 90 have different shapes and/or sizes.

One or more indicators 90 can be positioned along one or both of the side walls 20, 21. The indicators 90 are positioned on the upper quarter of the length of the ramp 40. These indicators 90 are visible from exit 105 and from the porch 30 to indicate the direction of travel along the ramp 40. In one example as illustrated in FIG. 4, identical indicators 90 are positioned at identical locations along each of the side walls 20, 21. In one example, as illustrated in FIG. 4, each of the indicators 90 is an arrow that points downward along the ramp 40.

Another visual cue is a slide end indicator 51 positioned at the second end 13 of the body 11. The slide end indicator 51 gives a visual indication of the end of the body 11 at the ground 110. This indicates to a person the length of the slide 10. As illustrated in FIGS. 3 and 4, the slide end indicator 51 can be a single target positioned downstream from a bottom end of the central divider 22 and that extends across both of the first and second slide lanes 41, 42. FIG. 6 includes a pair of slide end indicators 51 with one positioned at a bottom of each of the first and second slide lanes 41, 42. The two slide end indicators 51 are positioned on different sides of the central divider 22 that extends the length of the first and second slide lanes 41, 42.

The slide end indicator 51 provides a visual cue regarding the length of the slide 10 for persons who will be entering onto the ramp 40. The slide end indicator 51 also provides a visual cue for persons who are moving along the ramp 40 regarding the upcoming end of the ramp 40. This visual cue enables a person to prepare for the end of the slide and to transition onto the ground 110. In one example, the slide end indicator 51 is visible from both the exit 105 and porch 30 as well as various points along the ramp 40.

In one example, as illustrated in FIG. 4, the indicators 90 and jump targets 60, 61, slide end indicator 51 along the first and second slide lanes 41, 42 are symmetric about a centerline C/L. This visually indicates to a person that there are two slide lanes 41, 42. This reduces the likelihood of a person entering the ramp 40 at the center and occupying both slide lanes 41, 42 thus reducing the efficiency of the slide 10. The symmetry also visually indicates to a person standing on the porch 30 that both slide lanes 41, 42 are the same and either can be used to reach the ground 110.

The first and second jump targets 60, 61, slide end indicator 51, indicators 90, and jump line indicator 31 are attached to the body 11. These can be attached in various manners, including but not limited to a coating that is applied to the body 11 or a separate material that is attached by an adhesive. The various visual cues can be attached in the same or different manners.

The visual cues, including the first and second jump targets 60, 61, slide end indicator 51, jump line indicator 31, and indicators 90 have a different visual appearance than the body 11. This provides for these visual cues to be visible to instruct a person standing at the exit 105 and/or porch 30. In one example, these include the visual cues having one or more different colors than the body 11. One example includes one or more of these visual cues are high-contrast paint that exhibits improved contrast. In another example, one or more of the visual cues are reflective.

These different visual cues can further include different subsets of appearances. In one example, the first and second jump targets 60, 61 and the slide end indicator 51 include the same visual appearance. The indicators 90 each include the same appearance that is different than the first and second jump targets 60, 61 and the slide end indicator 51. In one example, the first and second jump targets 60, 61 and the slide end indicator 51 each have a white color. One or more of the first and second jump targets 60, 61 and the slide end indicator 51 include one or more indicators 90 that are a different color. In one example, the first and second jump targets 60, 61 are white with green indicators 90.

Indicators 90 can include the same or different colors. In one example, each of the indicators 90 includes the same color. In one example, each indicator 90 is green. In another example, each indictor 90 is green and outlined in white.

Lane markers 45 are positioned along the lateral sides of each of the first and second slide lanes 41, 42. The lane markers 45 are positioned on the side walls 20, 21 at the intersection with the respective slide lanes 41, 42. The lane markers 45 provide a visual indication, respectively, of the outer bounds of the first and second slide lanes 41, 42. In one example, the lane markers 45 include a narrow strip that extends along a majority or the entirety of each of the sidewalls 20, 21.

A lane marker 45 extends completely over the center divider 22. This visually indicates that the center divider 22 is a divider and is not a position where a person should enter onto the ramp 40. In another example, the center divider 22 includes first and second narrow strips that extend the length of the center divider. A first one of the strips is positioned at the intersection of the divider 22 and the first slide lane 41, and a second strip is positioned at the intersection of the divider and the second slide lane 42.

The lane markers 45 include a different visual appearance than the body 11, the first and second jump targets 60, 61, the slide end indicator 51, and the indicators 90. In one example, the lane markers 45 have a darker appearance than the other visual items to visually indicate that these are areas on the ramp 40 where a person should not enter. In one example, the lane markers 45 are black.

In one example, the first and second jump targets 60, 61 and the slide end indicator 51 are each white. A green indicator 90 is positioned on each of the first and second jump targets 60, 61. Indicators 90 are each green and are outlined in white. The jump line indicator 31 is white. The body 11 is grey. The lane markers 45 are black.

Ramp lights 80 are attached to the side walls 20, 21 and illuminate the first and second slide lanes 41, 42. A first set of ramp lights 80 on the side wall 20 face towards and illuminate the first slide lane 41. A second set of ramp lights 80 on the side wall 21 face towards and illuminate the second slide lane 42. At least one of the ramp lights 80a of the first set is aligned with the first jump target 60 along the ramp 40. At least one of the ramp lights 80b of the second set is aligned with the second jump target 61 along the ramp 40.

In one example, the ramp lights 80a, 80b in combination with the high-contrast or reflective material of the first and second jump targets 60, 61 cause the first and second jump targets 60, 61 to have a higher visibility than the remaining sections of the first and second slide lanes 41, 42. In one example as illustrated in FIG. 6, none of the other indicators 90 are aligned along the length of the ramp 40 with the ramp lights 80 to provide for the jump targets 60, 61 to be more visible than the indicators 90.

As illustrated in FIG. 3, slide exit lights 81 are positioned at the second end 13 of the body 11. The slide exit lights 81 face outward away from the body 11 to illuminate the ground 110 outward beyond the length of second end 13 of the slide 10. The slide exit lights 81 provide a visual indication to persons at the top of the slide 10 where they will be delivered to by the slide 10 and where they are to proceed once they are on the ground 110.

One or more aircraft lights 70, 71 that are mounted on the aircraft 100 can further illuminate the slide 10. As illustrated in FIG. 3, a fuselage light 71 is mounted in the outer wall of the fuselage 103 and illuminates the upper reaches of the slide 10. Additionally or alternatively, a door light 70 is positioned on a door 106. When the door 106 is opened away from the exit 105, the door light 70 shines on the upper sections of the slide 10. In one example, as illustrated in FIG. 3, the door 106 pivots open and the door light 70 is positioned on the interior of the door 106. In another example, the door 106 translates away from the exit 105 and the door light 70 is positioned on the exterior of the door 106.

The aircraft lights 70, 71 illuminate the upper reaches of the slide 10. In one example, the aircraft lights 70, 71 illuminate the porch 30 and the section of the ramp 40 from the edge 32 to the lower edges of the first and second jump targets 60, 61. In one example, the aircraft lights 70, 71 illuminate the upper third of the length of the slide 10. The aircraft lights 70, 71 cause a person to focus their visual attention on the porch 30 and top section of the ramp 40 to allow the person to safely and efficiently enter onto the ramp 40. In the various examples, the aircraft 100 can include one or more door lights 70 and one or more fuselage lights 71.

Figure 7:
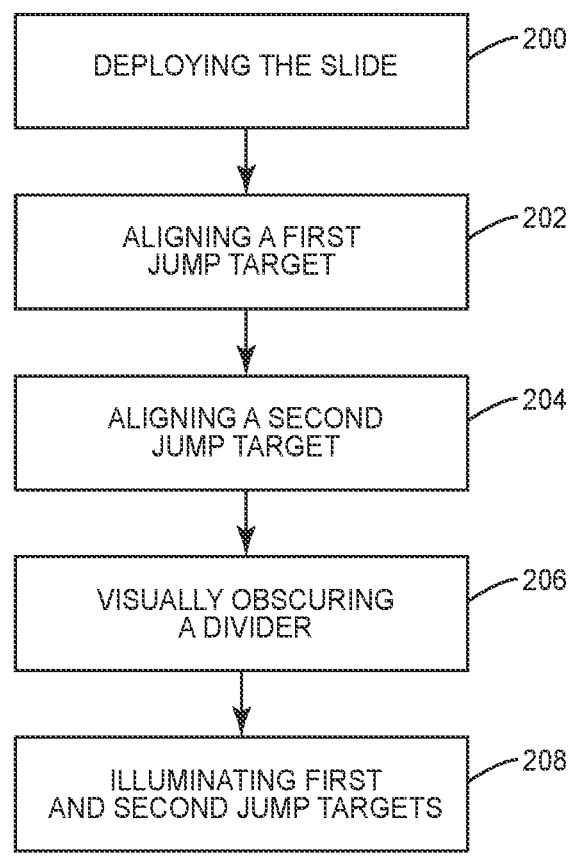
FIG. 7 is a flowchart diagram of a method of positioning a slide on an aircraft to provide an egress path from an exit of the aircraft.

FIG. 7 illustrates a method of a positioning a slide 10 on an aircraft 100 to provide an egress path from a door 106 of the aircraft 100. The method includes deploying the slide 10 (block 200). The porch 30 is attached to the aircraft 100 at the exit 105 and the ramp 40 extends from the porch 30. A distal end of the ramp 40 contacts a ground 110.

When the slide 10 is deployed, a first jump target 60 that is positioned on a first slide lane 41 is aligned away from the porch 30 (block 202). The first jump target 60 is located horizontally and vertically away from the porch 30. A second jump target 61 that is positioned on a second slide lane 42 is aligned horizontally and vertically away from the porch 30. The first and second jump targets 60, 61 are also horizontally spaced apart across the width of the slide 10 (block 204).

The method also includes visually obscuring an elevated divider 22 that extends along the ramp 40 and between the first and second jump targets 60, 61 (block 206). The method also includes illuminating the first and second jump targets 60, 61 a greater amount than a remainder of the ramp 40 (block 208).

In one example, the slide 10 includes a pair of slide lanes 41, 42. In other examples, the slide 10 includes three or more slide lanes 41, 42. Each of the slide lanes 41 includes one or more jump targets 61, indicators 90, and slide end indicators 51.

Figure 8:
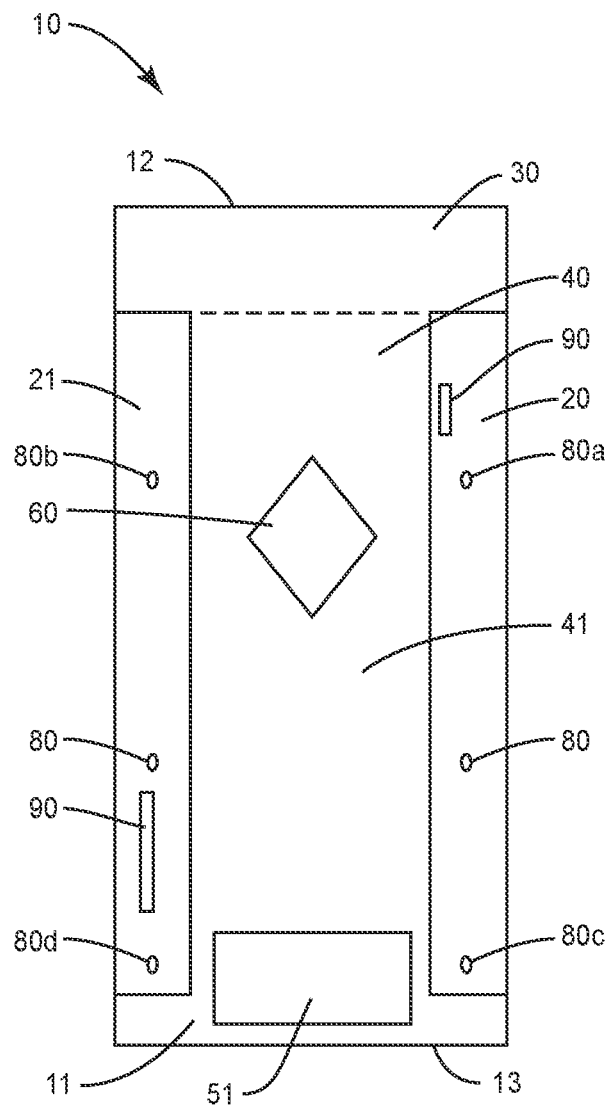
FIG. 8 is a front view of a slide in a flat, extended orientation to illustrate the porch and the ramp.

In another example as illustrated in FIG. 8, the slide 10 includes a single slide lane 41. A jump target 60 is positioned along the ramp 40 in proximity to the porch 30. In one example with a single slide lane 41, the jump target 60 is larger than the jump targets of a multiple-lane slide 10. Ramp lights 80 illuminate the slide lane 41, including ramp lights 80a, 80b that are aligned with the target 60. One or more indicators 90 are positioned along the ramp 40. A slide end indicator 51 is positioned at the second end 13 of the slide 10. Ramp lights 80c, 80d are aligned with and illuminate the slide end indicator 51.

In one example, each slide lane 41 includes a single jump target 60. The single jump target 60 may be relatively large and provide different aspects for persons of different size and/or jumping capabilities to attempt to contact when they enter the ramp 40. In another example, each slide lane 41 includes two or more smaller jump targets 60. A first jump target 60 is positioned in closer proximity to the porch 30 and provides a target for smaller persons. A second jump target 60 is positioned a farther distance from the porch 30 and provides a target for larger persons.

The slide 10 can be used on an aircraft 100 as described above, as well as a variety of vehicles. Vehicles include but are not limited to spacecraft, rotorcraft, rockets, various terrestrial vehicles, water borne vehicles, and combinations thereof.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A slide configured to be attached to an aircraft to provide an egress path from an exit of the aircraft, the slide comprising:
    a ramp comprising a first slide lane and a second slide lane that extend between an upper end and an opposing lower end;
    a central divider positioned between the first slide lane and the second slide lane;
    a first jump target positioned on the first slide lane and spaced away from the upper end;
    a second jump target positioned on the second slide lane and spaced away from the upper end;
    lane markers that extend along and outline lateral sides of each of the first slide lane and the second slide lane;
    the first jump target extending completely between the lane markers on opposing sides of the first slide lane; and
    the second jump target extending completely between the lane markers on opposing sides of the second slide lane.

2. The slide of claim 1, wherein the lane markers comprise strips that are attached to the ramp and extend along the lateral sides of the first slide lane and the second slide lane.

3. The slide of claim 1, wherein the lane markers comprise a first marker that extends along the lateral side of the first slide lane, a second marker that extends along the lateral side of the second slide lane, and a common central dividing marker that extends along a center line of the ramp.

4. The slide of claim 1, further comprising a slide end indicator positioned on the ramp at the lower end, the first and second jump targets and the slide end indicator having a higher visibility than the ramp.

5. The slide of claim 1, further comprising ramp lights spaced apart along the ramp to illuminate the first slide lane and the second slide lane, a first one of the ramp lights aligned with the first jump target and a second one of the ramp lights aligned with the second jump target.

6. The slide of claim 1, wherein the first jump target comprises:
    a background section with a different color than the ramp; and
    an arrow that extends over the background section and comprises a different color than both of the ramp and the background section.

7. The slide of claim 1, further comprising a porch extending outward from the upper end of the ramp and configured to attach to the aircraft, the porch configured to be aligned at an obtuse angle relative to the ramp when the slide is deployed.

8. The slide of claim 1, further comprising:
    a first string of ramp lights that are spaced apart and extend along an outer lateral side of the first slide lane, the first string of ramp lights positioned above the lane markers to illuminate the lane markers at the first slide lane; and
    a second string of ramp lights that are spaced apart and extend along an outer lateral side of the second slide lane, the second string of ramp lights positioned above the lane markers to illuminate the lane markers at the second slide lane.

9. A slide configured to be attached to an aircraft to provide an egress path from an exit of the aircraft, the slide comprising:

a ramp comprising:
  an upper end and an opposing lower end, the ramp comprising:
    a first side wall and a second side wall;
    a central divider positioned between the first and second side walls;
    a first slide lane positioned between the first side wall and the central divider, the first slide lane extends from the upper end to the lower end;
    a second slide lane positioned between the second side wall and the central divider, the second slide lane extends from the upper end to the lower end;
  a first jump target positioned on the first slide lane and extending completely across the first slide lane between the first side wall and the central divider;
    a second jump target attached to the ramp and extending completely across the second slide lane between the second side wall and the central divider; and
  each of the first jump target and the second jump target are spaced an equal distance away from the upper end of the ramp.

10. The slide of claim 9, wherein the first jump target and the second jump target each comprise a greater visibility than the ramp.

11. The slide of claim 9, further comprising a fuselage light configured to be attached to a fuselage of the aircraft, the fuselage light positioned to illuminate the first jump target and the second jump target.

12. The slide of claim 9, further comprising ramp lights spaced apart along a length of each of the first side wall and the second side wall and positioned to illuminate the first slide lane and the second slide lane, a first one of the ramp lights aligned with the first jump target and a second one of the ramp lights aligned with the second jump target.

13. The slide of claim 12, further comprising a slide end indicator positioned at the lower end of the ramp, the slide end indicator extending completely across both the first slide lane and the second slide lane.

14. The slide of claim 13, wherein the slide end indicator comprises a higher visibility than the first slide lane and the second slide lane.

15. The slide of claim 9, wherein the first jump target and the second jump target are each spaced an equal distance along the ramp away from the upper end.

16. The slide of claim 9, further comprising a porch extending outward from the upper end of the ramp, the porch configured to be aligned at an angle relative to the ramp when the slide is deployed to form a platform and with directional arrows to provide visual indicators towards each of the first slide lane and the second slide lane.

17. A method of a positioning a slide on an aircraft to provide an egress path from an exit of the aircraft, the method comprising:
  deploying the slide that is attached to the aircraft at the exit;
  aligning a first jump target positioned on a first slide lane horizontally outward from and vertically below the exit with the first jump target extending completely across the first slide lane;
  aligning a second jump target positioned on a second slide lane horizontally outward from and vertically below the exit with the second jump target extending completely across the second slide lane; and
  illuminating a first upper section of the first slide lane from the exit to the first jump target, and a second upper section of the second slide lane from the exit to the second jump target and visually obscuring an elevated divider that extends along the ramp between the first slide lane and the second slide lane.

18. The method of claim 17, further comprising visually highlighting a slide end indicator at a lower end of the ramp a greater amount than a section of the ramp that extends between the first and second jump targets and the slide end indicator.

19. The method of claim 17, further comprising aligning ramp lights with and illuminating the first and second jump targets.

20. The method of claim 17, further comprising visually obscuring the elevated divider that extends between the first slide lane and the second slide lane.

* * * * *